United States Patent
Fuller

(10) Patent No.: US 8,924,111 B2
(45) Date of Patent: Dec. 30, 2014

(54) ELECTRONIC CONTROLLER FOR A CONTINUOUSLY VARIABLE TRANSMISSION AND A METHOD OF CONTROL OF A CONTINUOUSLY VARIABLE TRANSMISSION

(75) Inventor: John William Edward Fuller, Preston (GB)

(73) Assignee: Torotrak (Development) Limited, Leyland, Lancashire (GB)

( * ) Notice: Subject to any disclaimer, the term of this patent is extended or adjusted under 35 U.S.C. 154(b) by 967 days.

(21) Appl. No.: 12/933,674

(22) PCT Filed: Mar. 19, 2009

(86) PCT No.: PCT/GB2009/050260
§ 371 (c)(1),
(2), (4) Date: Dec. 15, 2010

(87) PCT Pub. No.: WO2009/115844
PCT Pub. Date: Sep. 24, 2009

(65) Prior Publication Data
US 2011/0087411 A1 Apr. 14, 2011

(30) Foreign Application Priority Data

Mar. 20, 2008 (GB) .................. 0805213.6

(51) Int. Cl.
*F16H 61/00* (2006.01)
*F16H 61/664* (2006.01)
*F16H 15/38* (2006.01)

(52) U.S. Cl.
CPC ............ *F16H 61/6648* (2013.01); *F16H 15/38* (2013.01)
USPC .................. 701/61; 701/58; 701/60; 477/37; 475/186; 475/192

(58) Field of Classification Search
USPC ...................... 701/50, 55, 58, 60, 61; 477/37; 475/183, 185, 186, 192
See application file for complete search history.

(56) References Cited

U.S. PATENT DOCUMENTS

| | | | |
|---|---|---|---|
| 5,521,819 A * | 5/1996 | Greenwood .................. 701/60 |
| 6,080,079 A | 6/2000 | Sakai | |
| 6,142,908 A * | 11/2000 | Kidokoro et al. ............. 477/38 |
| 6,146,307 A * | 11/2000 | Takizawa et al. ............. 477/37 |
| 6,171,210 B1 * | 1/2001 | Miyata et al. ................ 475/216 |
| 6,193,627 B1 | 2/2001 | Bart | |
| 6,317,672 B1 * | 11/2001 | Kuramoto et al. ............ 701/51 |
| 6,604,039 B2 * | 8/2003 | Joe et al. ........................ 701/51 |
| 6,658,338 B2 * | 12/2003 | Joe et al. ........................ 701/51 |
| 6,801,844 B2 * | 10/2004 | Kawamura et al. ........... 701/51 |
| 6,839,617 B2 * | 1/2005 | Mensler et al. ................ 701/61 |
| 6,931,316 B2 * | 8/2005 | Joe et al. ........................ 701/61 |
| 2001/0016537 A1 | 8/2001 | Bamberger et al. ........... 477/37 |
| 2002/0019692 A1 * | 2/2002 | Yasuoka et al. ................ 701/55 |
| 2002/0115529 A1 * | 8/2002 | Narita et al. .................. 477/40 |
| 2002/0128115 A1 * | 9/2002 | Narita et al. .................. 477/37 |
| 2003/0195688 A1 * | 10/2003 | Mensler et al. ................ 701/61 |
| 2003/0228952 A1 * | 12/2003 | Joe et al. ........................ 476/10 |
| 2005/0043138 A1 * | 2/2005 | Fuller ............................. 477/37 |
| 2006/0235596 A1 * | 10/2006 | Suzuki et al. .................. 701/51 |
| 2006/0264295 A1 * | 11/2006 | Toyoda et al. ................ 475/216 |
| 2008/0004781 A1 * | 1/2008 | Herbster et al. ................ 701/58 |
| 2008/0027614 A1 * | 1/2008 | Field et al. ...................... 701/60 |
| 2008/0032858 A1 * | 2/2008 | Frank et al. .................... 477/37 |
| 2008/0058155 A1 * | 3/2008 | Sinojima ......................... 477/50 |
| 2008/0103019 A1 * | 5/2008 | Cronin et al. .................. 477/46 |

FOREIGN PATENT DOCUMENTS

| | | |
|---|---|---|
| CN | 1849475 A | 10/2006 |
| EP | 0 258 005 | 3/1988 |
| EP | 0 916 876 | 5/1999 |
| EP | 1 772 652 | 4/2007 |
| GB | 2 423 122 | 8/2006 |
| JP | 2000-009220 A | 1/2000 |
| JP | 2000-046135 A | 2/2000 |
| JP | 2000-205360 A | 7/2000 |
| JP | 2003-014096 A | 1/2003 |
| WO | WO 2004/085190 | 10/2004 |
| WO | WO 2005/015060 A1 | 2/2005 |
| WO | WO 2006/133987 | 12/2006 |

OTHER PUBLICATIONS

PCT International Search Report for PCT Counterpart Application No. PCT/GB2009/050260 containing Communication relating to the Results of the Partial International Search Report, 6 pgs., (Jun. 12, 2009).
PCT Written Opinion of the International Searching Authority for PCT Counterpart Application No. PCT/GB2009/050260, 9 pgs., (Jun. 12, 2009).
Patents Act 1977: Search Report under Section 17 for United Kingdom Counterpart Application No. GB0805213.6, 1 pg., (Jun. 20, 2008).
PCT international Preliminary Report on Patentability for Poi Application No. PCTIG82009i050260, 10 cps, (Sep. 21, 2010).

* cited by examiner

*Primary Examiner* — Thomas G Black
*Assistant Examiner* — Peter D Nolan
(74) *Attorney, Agent, or Firm* — Blakely, Sokoloff, Taylor & Zafman LLP

(57) ABSTRACT

The invention concerns an electronic controller for a continuously variable transmission of the type having a variator (10) with a rotary variator input (17) coupled to a first variator race (14*a*) and a rotary variator output (29) coupled to a second variator race (16*a*). At least one roller (20) runs upon the said races to transfer drive from one to the other. The roller is movable to steplessly vary the variator ratio. The variator further comprises at least one hydraulic actuator (36), (38) which acts upon the roller and through which net torque acting on the variator races is referred via the roller to the variator's casing. A hydraulic arrangement is provided for applying to the actuator at least one hydraulic control pressure which determines force applied' by the actuator and thus determines the reaction torque. The variator is coupled between a rotary transmission input (17) and a rotary transmission output (714) such that the transmission ratio is a function of the variator ratio. The electronic controller is adapted to cany out the following steps in a loop: measure a speed ratio of the continuously variable transmission; compare the measured speed ratio with a target speed ratio; determine a transmission output torque request on the basis of the said comparison; convert the output torque request to a control pressure request, taking account of the speed ratio; differentiate the control pressure request with respect to lime to obtain a compensation value and apply the compensation value to the control pressure request; and output the resulting compensated control pressure request to the hydraulic valve arrangement.

14 Claims, 6 Drawing Sheets

ELECTRONIC CONTROLLER FOR A CONTINUOUSLY VARIABLE TRANSMISSION AND A METHOD OF CONTROL OF A CONTINUOUSLY VARIABLE TRANSMISSION

CROSS-REFERENCE TO RELATED APPLICATIONS

This patent application is a U.S. National Phase application under 35 U.S.C. §371 of International Application No. PCT/GB2009/050260, filed on Mar. 19, 2009, entitled AN ELECTONIC CONTROLLER FOR A CONTINUOUSLY VARIABLE TRANSMISSION AND A METHOD OF CONTROL OF A CONTINUOUSLY VARIABLE TRANSMISSION, which claims priority to Great Britain patent application number 0805213.6, filed Mar. 20, 2008.

FIELD

The present invention relates to control of continuously variable transmissions ("CVTs"). It is applicable particularly, although not exclusively, to control of motor vehicle CVTs at low vehicle speeds.

BACKGROUND

A CVT typically incorporates a unit referred to as a "variator" having a rotary variator input, a rotary variator output, and a mechanism for transmitting drive from one to the other while enabling the ratio of output speed to input speed (the "variator ratio") to be steplessly varied.

A typical CVT further comprises gearing by means of which the variator is coupled between an overall transmission input (e.g. the drive shaft of a vehicle engine) and output (e.g. the final drive of the vehicle, leading to its wheels). The ratio of the speeds of the transmission output and input (the "transmission ratio") is typically not the same as the variator ratio, being modified by the gearing.

Such gearing may include a "shunt" gear, typically of epicyclic type, enabling the transmission to provide very low, and even zero, output speed while its input is being driven. The shunt has a first part coupled to the variator's input side, a second part coupled to the variator's output side, and a third part coupled to the transmission output. By suitable design of the shunt gearing it can be arranged that at a certain variator ratio, the speeds of the first two parts cancel each other out, and the transmission output is thus stationary even though it remains mechanically coupled to the rotating transmission input. This condition in which the transmission provides an infinite speed reduction is referred to as "geared neutral". Variator ratios on opposite sides of geared neutral provide opposite directions of rotation at the transmission output (forward and reverse, in a vehicle transmission).

A transmission of this type is in principle able to drive a motor vehicle at a sustained and very slow speed, a facility which is potentially very useful. Problems arise, however, in controlling the variator under such conditions.

Before explaining the problems, it is necessary to say something about the construction and control of a variator. A variator of toroidal-race rolling-traction type is illustrated in FIGS. 1 and 2. This type of variator is in itself well known in the art. It is presented here merely to illustrate certain relevant principles.

The illustrated variator 10 has twin toroidal cavities 12a, b, each defined between a respective input race 14a, b and output race 16a, b. The races are mounted for rotation about a common axis 15, defined in this example by a variator shaft 17. Facing surfaces of the input/output race pairs are semi-toroidally recessed (as seen at 18 in FIG. 2 and indicated by dashed lines in FIG. 1), and within each of the cavities 12a, b is a set of rollers 20a, b running on the recessed surfaces. The rollers serve to transfer drive between the input and output races. In the illustrated example each cavity 12a, b contains three rollers 20a, b, although FIG. 1 shows only one of those, for the sake of simplicity. Each roller has an axis, which in FIG. 1 is perpendicular to the plane of the paper and is indicated at 22a, b, and is mounted in a yoke 24a, b for rotation about its axis. The two output races 16a, b are coupled to rotate together. In the illustrated example this coupling is made through the shaft 17 upon which they are both mounted e.g. through splines (not seen). The two input races are also coupled to rotate together, e.g. through a sleeve 26, but are able to rotate independently of the shaft 17, being mounted upon it through bearings (not seen). The sleeve 26 in this example carries a pulley or gear 29 which engages with a bolt or chain (not shown) to form the variator output. A force is applied as indicated by an arrow 28 to urge the races 14a, b, 16a, b into engagement with the rollers and so provide roller/race traction.

When the shaft 17 and the input races 14a, b carried upon it are driven to rotate, they cause the rollers 20a, b to spin about their axes, and the rollers drive the output races 16a, b. In this way the variator transmits drive.

The rollers are able to move to steplessly vary the variator ratio. In the illustrated example the yoke 24a, b of each roller is connected through a piston rod 34a, b to a respective piston 36a, b running in a cylinder 38a, b to form a hydraulic actuator. As the piston 36a, b moves in its cylinder, its roller 20a, b moves along a circular path about common axis 15. Note also that each roller is able to undergo a tilting motion, turning about an inclined axis 39a, b defined by its coupling to the piston 36a, b. As each roller moves back and forth it suffers a steering effect due to the action of the races upon it, causing it automatically to tilt to find a position in which the roller axis 22a, b intersects the common axis 15 of the races. All of the rollers 20a, b undergo such motion substantially in unison. The roller's tilting motion causes a change in the relative speeds of the input and output races—i.e a change in variator speed ratio.

When power is transmitted through the variator, the races exert a net force on the rollers tending to move them along their circular path about the common axis 15. Since this force acts about the axis, at a distance from it equal to the radius of said circular path, it can be expressed as a torque (force multiplied by distance) acting about the axis. This torque must be reacted through the actuators 36, 38 to a fixed object such as the variator's casing (not shown). The sum of such torques acting on all of the rollers is the total torque reacted to the casing and is thus referred to as the "reaction torque".

The force excited upon each roller by the races must be directly balanced by the force exerted on the roller by its actuator 36, 38. Hence by setting the actuator's force (which is determined by a difference in pressures between hydraulic lines 40a, b supplying opposite sides of each piston 36a, b), reaction torque is directly set.

Furthermore reaction torque must clearly be equal to the net torque applied to the variator—i.e. to the sum of the torques acting on its input and output. This quantity is thus directly controlled by controlling the actuator force.

Note that the physical system illustrated in FIGS. 1 and 2 provides no direct means of setting a required variator speed ratio. Instead, changes in ratio take place automatically, by virtue of the physical construction of the transmission, as a result of the torques at the variator's input and output. To appreciate this, consider the grossly simplified and schematic representation provided in FIG. 3. An engine exerts an engine torque TE on the transmission input side. The action of the variator creates a torque TIN on the same side of the transmission. Both act upon the inertia WIN referred to the variator input (contributed by rotating parts of the engine and transmission). The net torque TE+TIN acts on the inertia WIN and, if the net torque is non-zero, causes it to accelerate. Variator speed ratio automatically changes to accommodate such acceleration. On its output side of the transmission's torque TOUT is added to any torque TB from the vehicle brakes and torque TW at the wheels due to drag the vehicle being on a slope etc to provide a net torque acting on inertia WOUT (which includes the inertia of the vehicle itself, as well as that of the final drive etc) to determine its acceleration. Again, variator speed ratio changes automatically to accommodate the acceleration.

A variator arranged to regulate reaction torque is sometimes referred to in the literature as being "torque controlled" to distinguish from more conventional transmissions in which ratio is directly regulated, such transmission being referred to as "ratio controlled".

Many known transmissions use hydro-mechanical feedback to achieve ratio control of the variator. For example, a valve may be provided to set the hydraulic pressure controlling the variator, the valve being itself controlled through (a) a mechanical connection to the one of the rollers, to sense its position and (b) a mechanical input signal representing the required ratio. The valve serves to compare the two signals and to modulate the piston pressure to achieve the required roller position. Such systems are typically implemented using variators somewhat different in construction from the one seen in FIGS. 1 and 2. An example can be found in US 2003/0228952 (Joe et al). The present invention is not concerned with transmissions of this type.

Successful torque controlled transmissions have to date typically been reliant on sophisticated control strategies implemented in software in which engine torque demand and variator reaction torque are controlled in a coordinated manner. Examples are to be found in published international patent application WO 04/085190 (application PCT/EP04/03293).

For the sake of completeness and clarity, FIG. 7 illustrates in a highly simplified form one example of a complete transmission including an epicyclic "shunt" gear arrangement. The motor vehicle's engine E drives the input shaft 17 of the variator 10. The variator shaft 17 thus forms the variator's rotary input, and also the input of the transmission as a whole. A gear train 700 also couples the variator shaft 17 to a shaft 702 of a planet carrier 704 of an epicyclic gear train 706. Sun gear 708 of the epicyclic gear train 706 is coupled by a chain drive 710 to the variator's output races 16a, b, which thus form the variator's rotary output. Ring gear 712 of the epicyclic gear train 706 is coupled to a rotor 714 forming the transmission output. In the drawing the rotor 714 is shown to be coupled directly to the vehicle wheels 716, although in reality this coupling is normally made via the driveshaft, differential gear etc.

Stability is a crucial factor with regard to both the physical design of the transmission and the method used to control it. The variator rollers would, in the absence of suitable damping, suffer unwanted oscillation. The most simple mode of oscillation involves movement of all of the rollers in unison about their equilibrium positions, with consequent variation of transmission ratio which can be experienced by vehicle passengers as judder or vibration.

The type of variator presented in FIGS. 1 and 2 is typically provided with hydraulic damping to overcome the problem. FIG. 4 shows a suitable hydraulic arrangement in highly schematic form. Pressure control valves P1 and P2 are supplied with pressurised hydraulic fluid by a pump (not shown). An electronic controller 50 sends to each of the valves a respective pressure demand, and in response the valves each output a corresponding pressure through associated supply lines S1 and S2 feeding opposite sides of the variator pistons 36 (only one of which is shown in FIG. 3). By controlling the valves P1 and P2 the electronic controller controls the piston force and hence the variator reaction torque. Note however that the supply lines S1 and S2 incorporate respective damping orifices O1 and O2. These are formed as constrictions in the supply lines, and typically as sharp-edged orifices, whose flow resistance does not vary greatly with fluid viscosity, and hence with temperature. Piston movement creates flow through the orifices, and that flow creates pressure changes across the orifices O1 and O2 tending to resist the piston movement. The orifices thus to give rise to a force which opposes piston motion and is related to piston speed. In the conventional analysis of harmonic motion such a term is regarded as providing damping, and that is its effect in the present context.

Note also that the hydraulics possess a degree of compliance. In FIG. 4 the compliance is represented by accumulators C1 and C2. In practice, a degree of compliance is created even without provision of accumulators as such by virtue of compressibility of the hydraulic fluid (which becomes somewhat aerated in use), the volumes of the working chambers on either side of the pistons, etc. The compliance creates a phase lag between fluid flow and the aforementioned pressure changes. This is again desirable with regard to variator stability. Production pressure control valves typically exhibit a lead term between flow and pressure. The illustrated hydraulic circuit prevents the variator and the valves interacting in an unstable way by cancelling the lead term from the valves by the lag term due to the compliance. Also the variator, even with the damping orifices, proves potentially unstable when coupled to a vehicle drive line, which can be thought of in the context as a torsion spring since it can store energy due to "wind up". The inclusion of hydraulic compliance makes the variator behave like a rotational damper. It thus damps the driveline oscillations rather than inciting them.

A less desirable effect of the damping is that it produces a lag between changes in the pressures demanded of the valves P1 and P2, and corresponding changes in the pressures applied to the pistons 36. The effect is equivalent to applying a low pass filter to the pressure demand, as illustrated in FIG. 5. The dotted line represents a pressure demand, which is in this particular example a sine wave, merely for purposes of illustration. The continuous line represents the actual pressure applied to the piston 36, and can be seen to lag behind the demand by a lag time Tor.

In order to provide good transmission control at low speeds, the system controlling the transmission must be able to react quickly to changing conditions. The hydromechanical damping makes this problematic. Suppose for example that the electronic controller is programmed to apply closed loop control to regulate the transmission. The combination of (a) rapid and responsive closed loop control through the electronics with (b) a damped hydromechanical system is found to be potentially unstable due to the phase lag Tor, which can give rise to positive feedback. Addressing this problem is an object of the present invention.

Consider now some of the situations in which vehicles are required to maintain a low speed. Various such situations arise in relation to agricultural vehicles, e.g. tractors.

When ploughing, the load on the engine is contributed mainly by the plough itself and varies according to the nature of the soil. It is desirable to maintain a fairly brisk pace, but this must be done without allowing the engine to stall when the plough encounters unyielding soil. Maintenance of a constant ground speed is not of great importance. The soil behaves in this context somewhat like a viscous fluid, so that the force needed to propel the plough is roughly proportional to speed. If, with a fixed transmission speed ratio, the engine struggles and slows, the load is thus reduced and engine stall avoided.

When rotivating (treating the soil using a rotary implement driven from the tractor's power take off, which is driven from the engine through a fixed ratio transmission separate from the one driving the vehicle wheels) engine load is contributed largely by the rotivator, and may cause the engine to slow when unyielding soil is encountered. It is desirable that there should be a constant ratio of vehicle wheel speed to rotivator speed. This can be provided by operating at fixed transmission speed ratio.

It is sometimes necessary simply to maintain a very low ground speed. For example a tractor may be required to pass very slowly by fruit pickers loading fruit into a trailer. A water blasting arrangement, for cleaning etc., may need to be towed very slowly past a building being blasted. Required speeds can be as low as 30 meters per hour. The transmission speed ratio required to provide such low ground speed is so low that no significant load can be applied to the engine, so with a speed governed engine a constant transmission ratio gives constant speed.

In all of these examples, the required results can be obtained by controlling the transmission to provide a constant—and very low—transmission ratio. Management of a torque controlled variator to provide this is problematic, however. Again, it is important to emphasise the difference in this respect between a ratio controlled transmission and a torque controlled transmission. In the former, control electronics set the required ratio and the hydraulics (e.g. the valve mentioned above, responsive to roller position and variator ratio) automatically control the variator to adjust it to that ratio. In a torque controlled transmission, the hydraulics regulate reaction torque. If reaction torque were not adjusted, transmission ratio would vary as, for example, the vehicle encountered inclines or other obstacles, or the load from a plough changed as the plough was raised and lowered. To maintain constant ratio the electronics controlling the variator must be able to rapidly adjust the reaction torque demanded of the hydraulics.

A stern test of a transmission control system involves driving the vehicle at very low speed over an obstacle in the form, of a square beam of say 30 centimeters height and width, the aim being to maintain a constant speed as the vehicle wheels first climb the beam's front face, placing a load on the power train, then reach its upper face, abruptly unloading it, and then begin to descend the beam's rear face, requiring the engine to be abruptly placed in overrun (engine braking). The trial is straightforward for a tractor with a conventional (stepped ratio) gearbox, since the transmission ratio cannot fluctuate and the engine speed can be taken to be constant (due to the use of a speed governed diesel engine having its own speed controller). It is highly challenging for a tractor with a torque controlled CVT, in which reaction torque must be rapidly adjusted in accordance with the changes in wheel load in order to maintain the required ratio.

SUMMARY

It is important to emphasise that while the present invention has been devised in connection with agricultural vehicles it has potential applications in relation to vehicles of other types.

In accordance with a first aspect of the present invention, there is an electronic controller for a continuously variable transmission comprising a variator which has a rotary variator input coupled to a first variator race, a rotary variator output coupled to a second variator race and at least one roller which runs upon the said races to transfer drive from one to the other, the roller(s) being movable to steplessly vary the variator ratio, the variator further comprising at least one hydraulic actuator which acts upon the roller(s) and through which net torque acting on the variator races, which quantity will below be called the reaction torque, is referred via the roller(s) to the variator's casing, and a hydraulic arrangement for applying to the actuator(s) at least one hydraulic control pressure which determines force applied by the actuator(s) and thus determines the reaction torque, the variator being coupled between a rotary transmission input and a rotary transmission output such that the transmission ratio is a function of the variator ratio, the electronic controller being adapted to carry out the following steps in a loop:

measure a speed ratio of the continuously variable transmission;

compare the measured speed ratio with a target speed ratio;

determine a transmission output torque request on the basis of the said comparison;

convert the output torque request to a control pressure request, taking account of the speed ratio;

differentiate the control pressure request with respect to time to obtain a compensation value and apply the compensation value to the control pressure request; and output the resulting compensated control pressure request to the hydraulic valve arrangement.

In accordance with a second aspect of the present invention there is a method of controlling a continuously variable transmission comprising a variator which has a rotary variator input coupled to a first variator race, a rotary variator output coupled to a second variator race and at least one roller which rims upon the said races to transfer drive from one to the other, the roller(s) being movable to steplessly vary the variator ratio, the variator further comprising at least one hydraulic actuator which acts upon the roller(s) and through which net torque acting on the variator races, which quantity will below be called the reaction torque, is referred via the roller(s) to the variator's casing, and a hydraulic arrangement for applying to the actuator(s) at least one hydraulic control pressure which determines force applied by the actuator(s) and thus determines the reaction torque, the variator being coupled between a rotary transmission input and a rotary transmission output such that the transmission ratio is a function of the variator ratio, the method comprising carrying out the following steps in a loop:

measure a speed ratio of the continuously variable transmission;

compare the measured speed ratio with a target speed ratio;

determine a transmission output torque request on the basis of the said comparison;

convert the output torque request to a control pressure request, taking account of the speed ratio;

differentiate the control pressure request with respect to time to obtain a compensation value and apply the compensation value to the control pressure request; and output the resulting compensated control pressure request to the hydraulic valve arrangement.

Despite its simplicity, and somewhat unexpectedly, this controller proves highly effective. A prototype vehicle having a controller embodying the invention has been shown to excel in the "beam" test explained above, and to provide highly stable control of vehicle wheel speed.

The speed ratio measured by the controller could be the transmission ratio, but in the preferred embodiment it is the variator ratio. In either case the relevant measurement preferably involves sensing input and output speeds. Where variator ratio is measured it may be converted to transmission ratio for use in the subsequent steps.

The comparison of measured speed ratio with target speed ratio preferably involves subtracting one from the other.

The determination of the output torque request is preferably carried out by a proportional integral controller on the basis of the aforementioned comparison.

Preferably the compensation value is obtained by multiplying the differential of the control pressure request (i.e. the gradient of the curve of control pressure against time) by a factor corresponding to a time lag in the hydraulic arrangement.

It is particularly preferred that the transmission is of the type which incorporates a shunt gear and is able to provide geared neutral.

The hydraulic arrangement typically includes a pressure control valve arranged to output the control pressure to the actuator(s), the pressure control valve being arranged to receive the compensated control pressure request and being adapted to adjust the control pressure in accordance with the request. In a conduit connecting the pressure control valve and the actuator there is preferably a constricted orifice across which a pressure difference is created by through-flow. Still more preferably the hydraulic arrangement comprises compliance creating a time lag between adjustment of the valve's output pressure and a corresponding change in the pressure received by the actuator.

According to a third aspect of the present invention, there is a transmission comprising a variator which is adapted and arranged to regulate variator reaction torque and which is coupled between a transmission input and a transmission output such that transmission ratio is a function of variator ratio, the transmission comprising an electronic controller adapted to measure a speed ratio of the continuously variable transmission;

compare the measured speed ratio with a target speed ratio;

determine a transmission output torque request on the basis of the said comparison;

convert the output torque request to a control pressure request, taking account of the speed ratio;

differentiate the control pressure request with respect to time to obtain a compensation value and apply the compensation value to the control pressure request; and output the resulting compensated control pressure request to the hydraulic valve arrangement.

BRIEF DESCRIPTION OF THE DRAWINGS

Specific embodiments of the present invention will now be described, by way of example only, with reference to the accompanying drawings, in which:—

DETAILED DESCRIPTION

Figure 1:
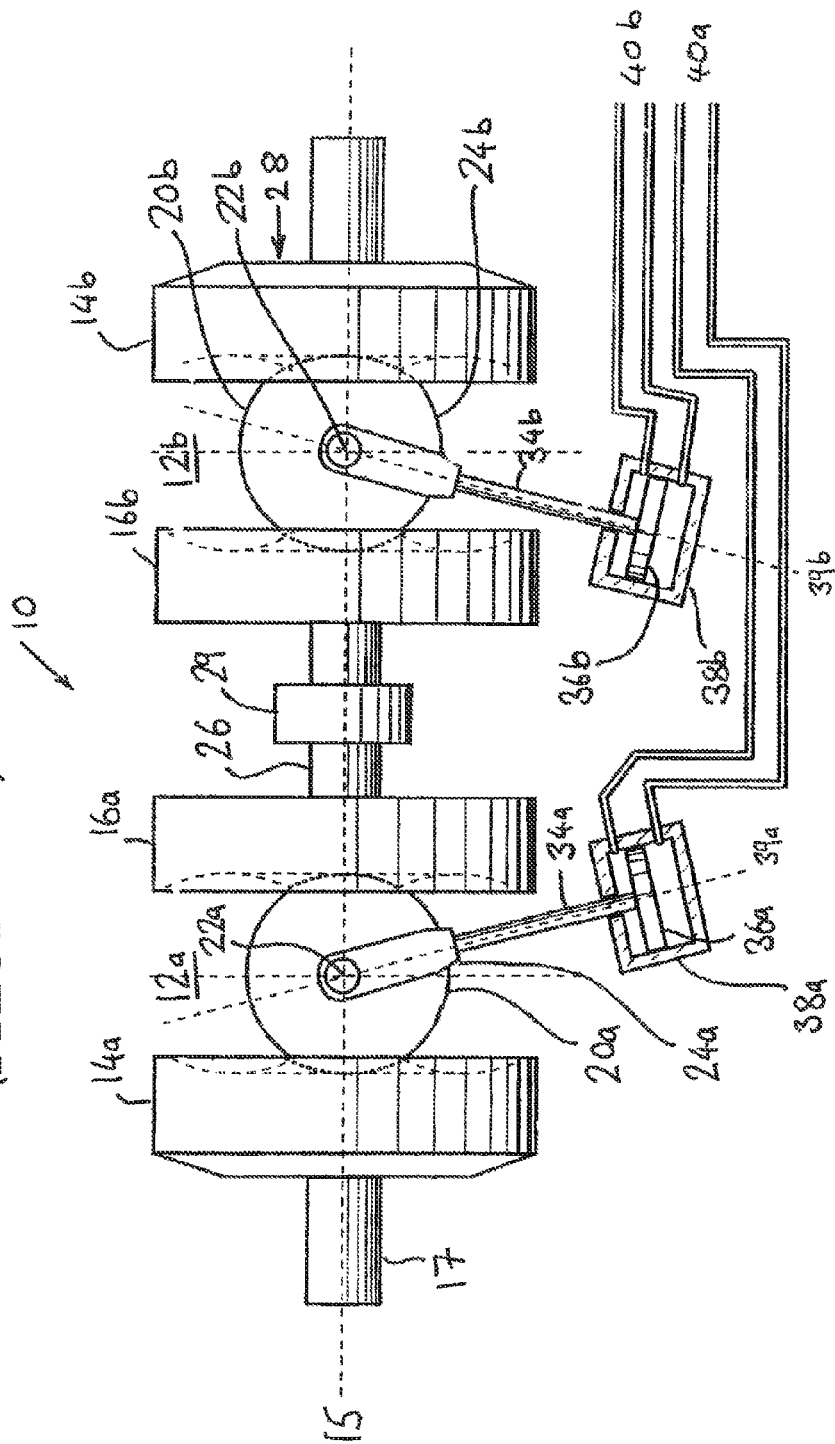
FIG. 1 is a simplified representation of a variator viewed along a direction radial to its main axis.
Figure 2:
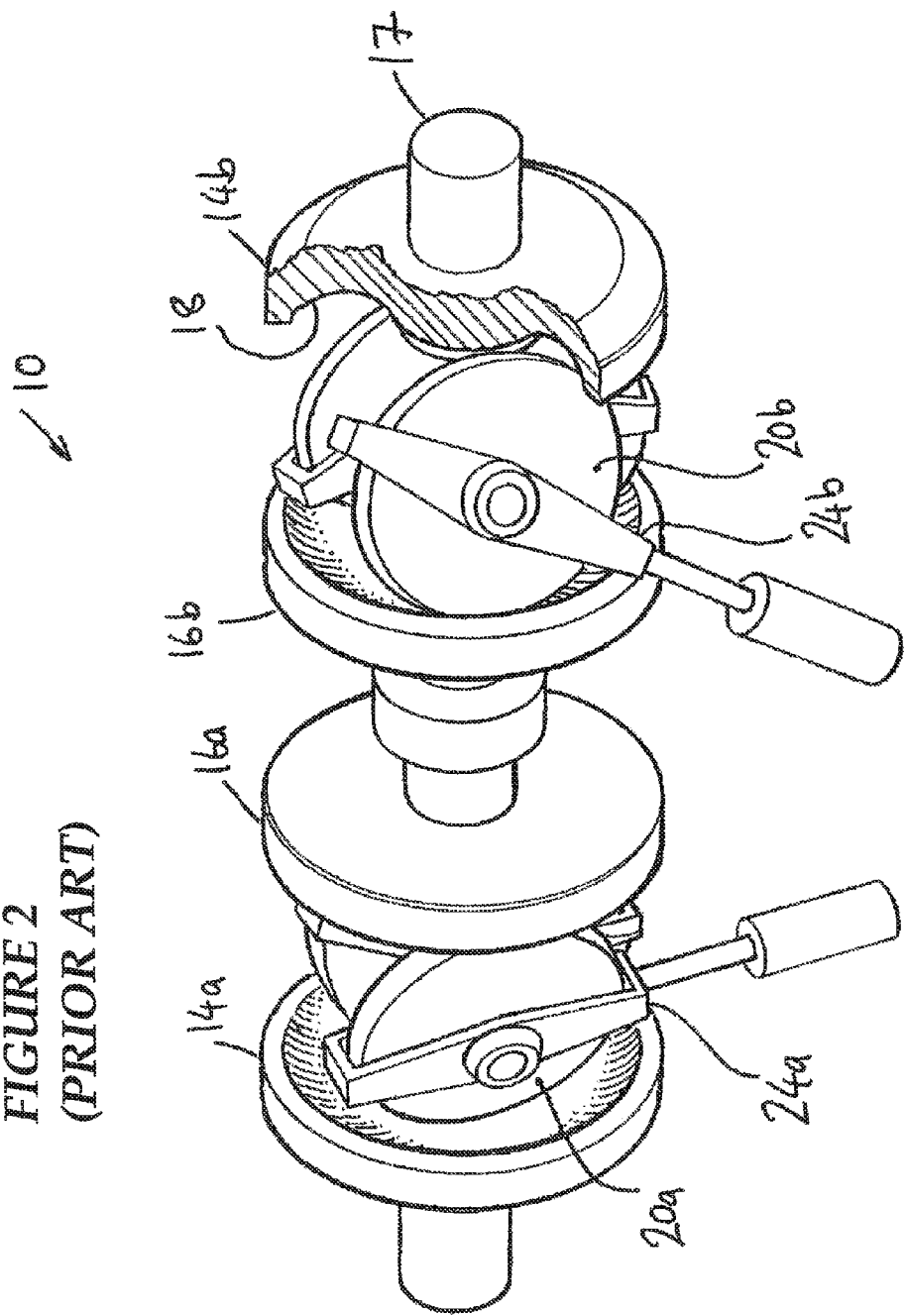
FIG. 2 is a perspective view of the same variator.
Figure 3:
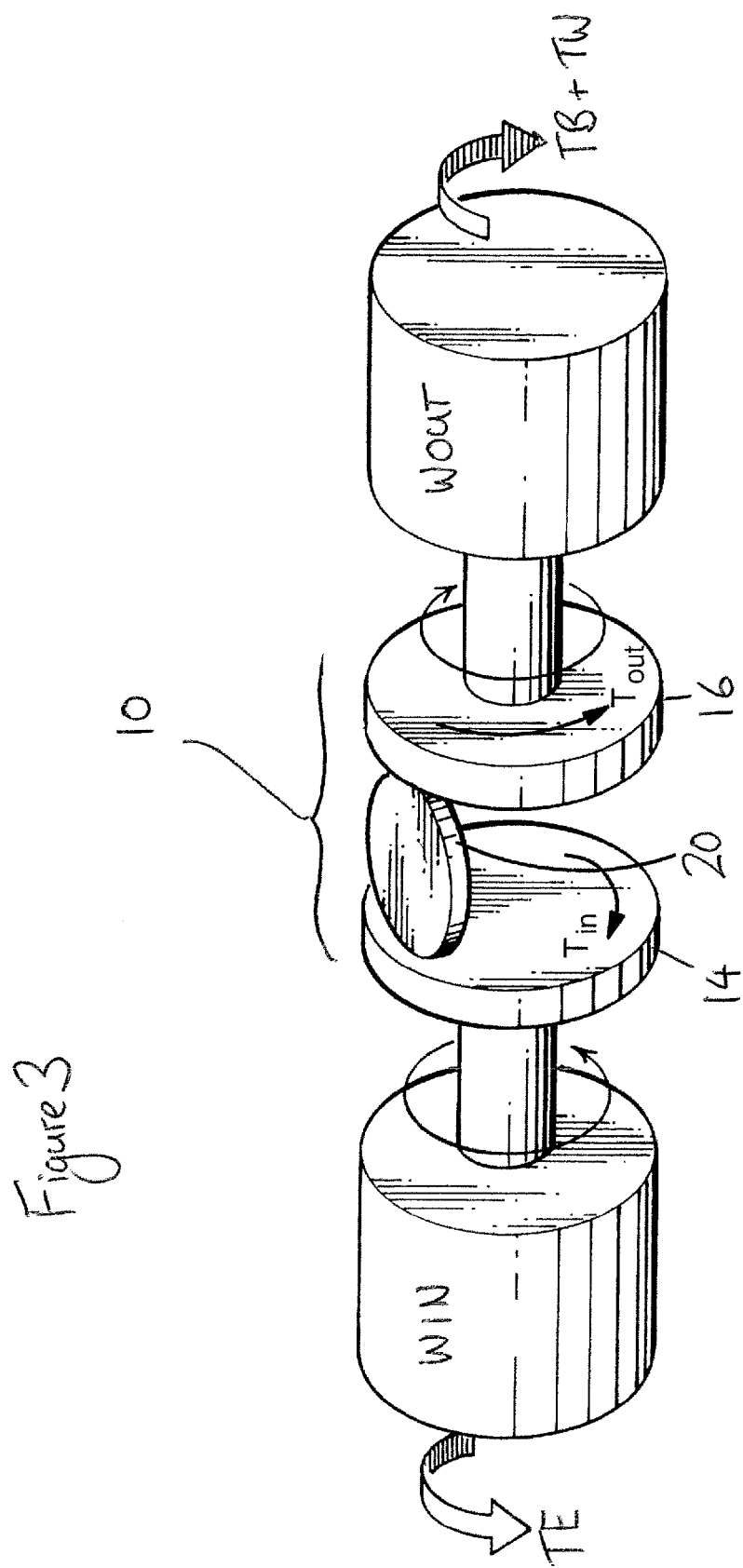
FIG. 3 is a simple diagram representing inertias and torques in a CVT.
Figure 4:
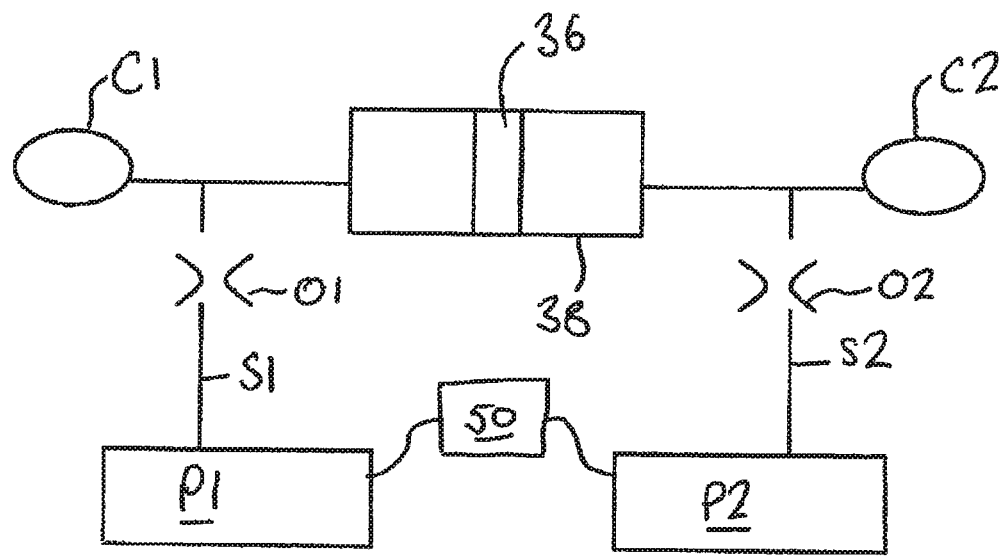
FIG. 4 is a highly simplified representation of a hydraulic circuit for controlling a variator.
Figure 5:
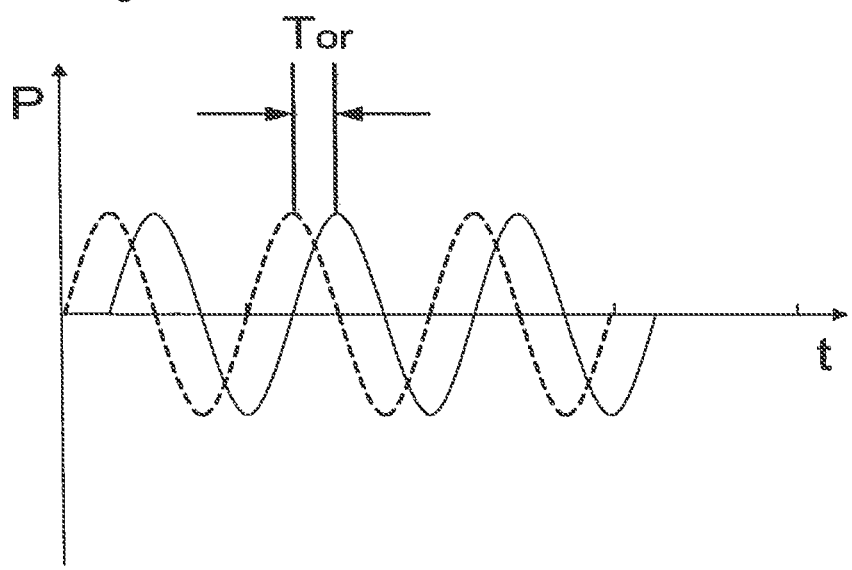
FIG. 5 is a graph representing time variation of pressure and pressure demand in hydraulics controlling a variator.
Figure 6:
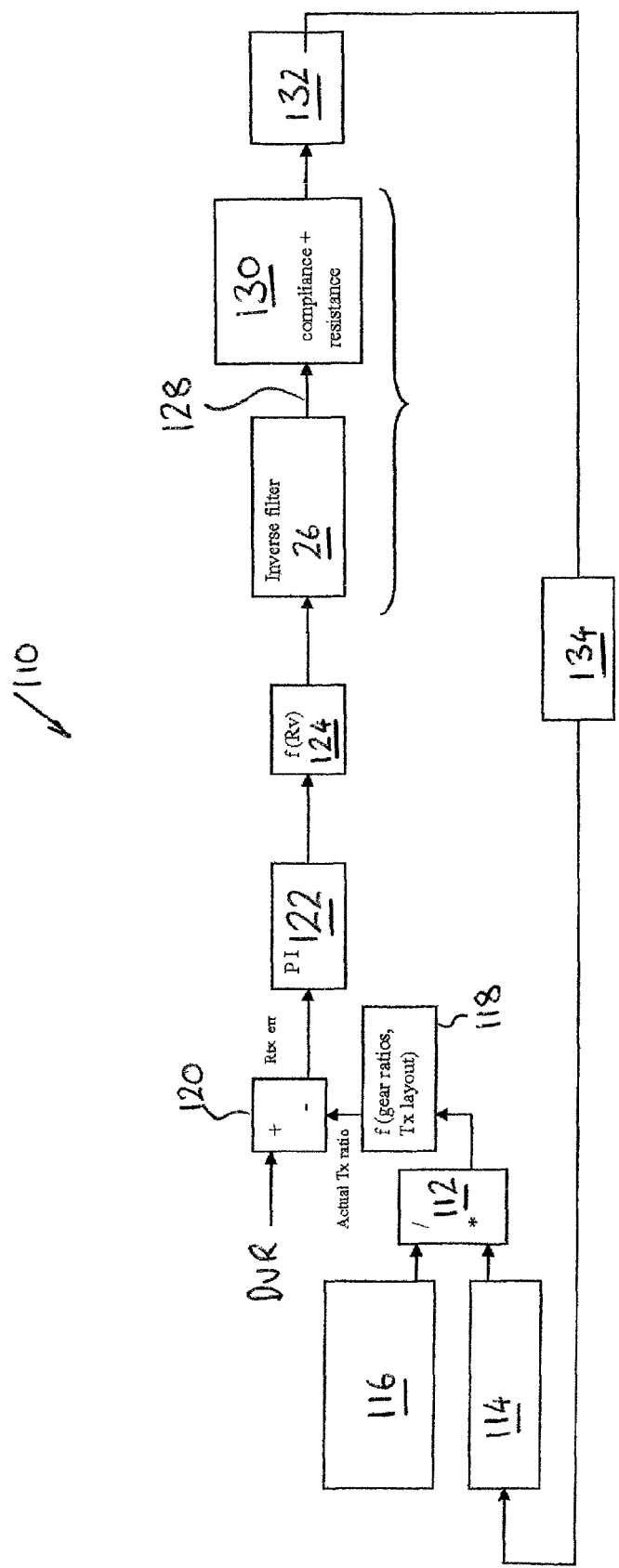
FIG. 6 is a block diagram representing the main functional elements of a control system embodying the present invention.
Figure 7:
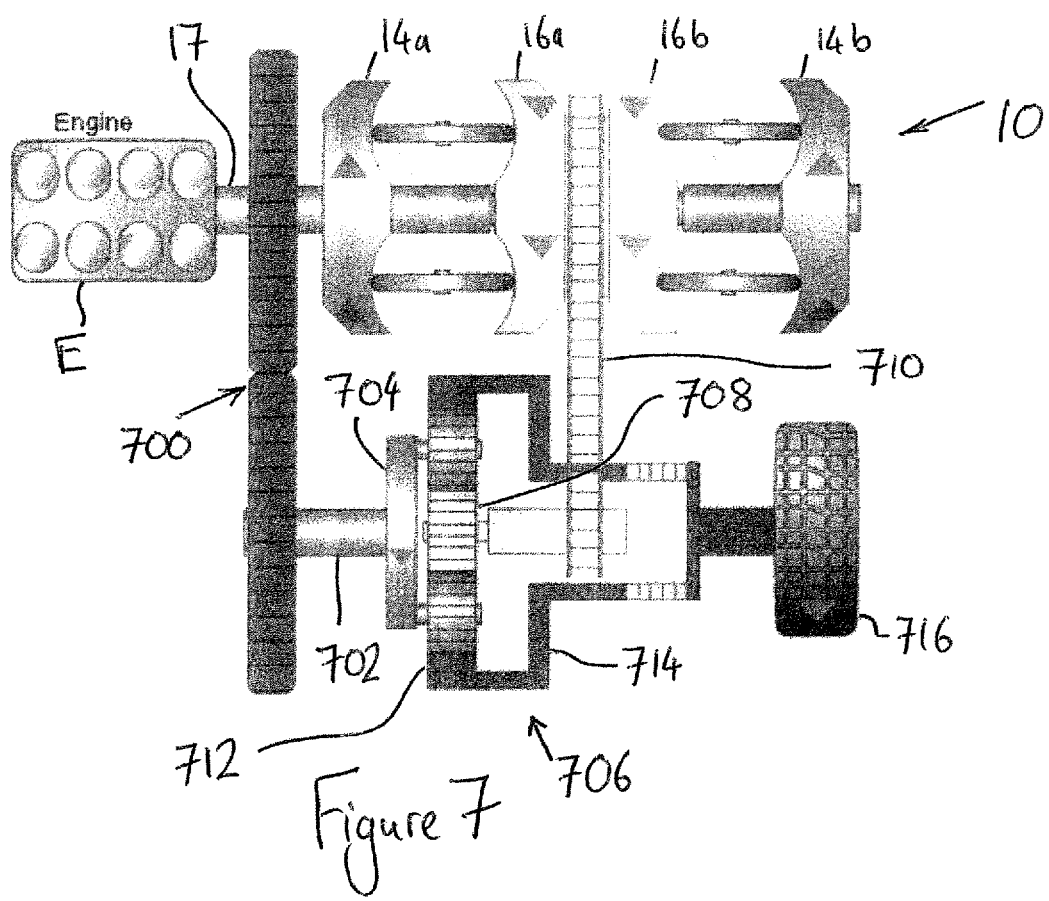
FIG. 7 is a simplified representation of a transmission incorporating the variator of FIGS. 1 to 3.

The system 110 represented in FIG. 6 is for use with a CVT having a torque controlled variator such as the one represented in FIGS. 1 to 4 and 7. It serves to determine a variator control variable in response to sensed quantities and in accordance with a ratio demand from the driver. In the broadest possible terms, the system can be regarded as providing closed loop control based upon transmission ratio error (i.e. difference between actual and demanded transmission ratio).

The system repeatedly measures current transmission ratio. In principle this could be done by measuring transmission output speed and transmission input speed and dividing one by the other. However this approach becomes less effective as transmission output speed falls toward zero, and sensor noise consequently dominates over the measured speed. Variator output speed never approaches zero while the engine is running, so the approach adopted in the present embodiment is to base the ratio calculation on variator output speed instead of transmission output speed. At 112 in FIG. 6 the measured variator output speed (from sensor 114, whose output is subject to a low pass filter to reduce noise) is divided by the measured variator input speed (from sensor 116, likewise via a low pass filter). This quantity is related to transmission ratio by a straightforward function based upon the transmission layout and gear ratios, and the relevant conversion is made at 118 to give a measured transmission ratio.

At 120 in FIG. 6 the measured transmission ratio is compared to the demanded value DVR of the transmission ratio, which in the present embodiment is set by the driver. The resulting error (the difference between the measured and demanded ratio) is used as the basis of the closed loop control, being supplied to a PI (proportional integral) controller 122 which determines the effort to be exerted to correct the transmission ratio error. PI controllers are well known. The correction effort is the sum of (a) the ratio error multiplied by a first coefficient $K_p$ and (b) a numerical integral of the ratio error multiplied by a second coefficient $K_i$. The output of the PI controller represents torque to be exerted at the driven vehicle wheels ("wheel torque").

Recall that the variator is constructed to provide a reaction torque which corresponds to the pressure difference across its pistons 36. This pressure difference is the variator's control variable. In order to calculate the reaction torque (and hence the pressure difference) required to create a given wheel torque, it is necessary to take account of current variator ratio, which is available having been determined at step 112 in FIG. 6. Functional block 124 serves to convert the required wheel torque to a variator pressure request, taking account of variator ratio.

The effort exerted to correct a given ratio error thus depends not only on the error (and its time integral) but also on the current variator ratio.

Recall from the discussion above that there is a lag Tor between changes in the pressure request applied to the valves controlling the variator and the corresponding changes in pressures applied to the variator. The pressure request output from block 124 is modified at 126 to compensate for this lag. This is done by numerically differentiating the pressure request, multiplying the differential by a coefficient Kt and adding the resulting compensation value to the pressure request signal. The coefficient Kt represents the time lag Tor created by the hydraulics.

The hydraulics apply what is in effect a low pass filter to the demanded variator pressures, in the manner that was described above. The operation carried out at step 126 is in effect a high pass filter applied to the pressure request. The high pass filtering implemented in the control electronics compensates for the low pass filtering caused by the hydraulics. The result is a system which is stable despite having a rapid rate of response.

The output 128 of step 126 is the variator's control variable and represents the pressure request to be used in controlling the valves (e.g. P1 and P2) associated with the variator. This is the main output of the control system. However FIG. 6 also serves to illustrate how the control loop is closed. The effective low pass filtering of the pressures by the hydraulics is represented by box 130 and it is the pressures resulting from this process that act upon the variator and so determine the reaction torque created by the variator, and hence the wheel torque. Changes in the speed of the vehicle wheels depend upon the wheel torque and upon the vehicle inertia, inclination of the ground, wheel slip (traction) etc., as explained above with reference to FIG. 3, and box 132 in FIG. 6 represents the relevant vehicle inertia/resistance. Any change in wheel speed is reflected in a corresponding change of variator output speed, although the two speeds differ by virtue of the shunt gearing etc (box 134) and variator output speed is of course one of the inputs to the control loop, which is therefore closed.

The control system is electronically implemented. In principle it could be an analogue electronic system. Well known analogue circuits can be used to implement all of the functions—filters, adders etc—and in the past variator controllers were constructed in this way. In practice, however, a digital implementation is favoured. A suitably programmed microprocessor receives the outputs from sensors 114 and 116 as well as the driver's indication of ratio demand and, in a repeating loop, calculates the control variable (pressure request) 128.

What is claimed is:

1. An electronic controller for a continuously variable transmission comprising a variator which has a rotary variator input coupled to a first variator race, a rotary variator output coupled to a second variator race and at least one roller which runs upon the said races to transfer drive from one to the other, the roller(s) being movable to steplessly vary the variator ratio, the variator further comprising at least one hydraulic actuator which acts upon the roller(s) and through which net torque acting on the variator races is referred via the roller(s) to the variator's casing, and a hydraulic arrangement for applying to the actuator(s) at least one hydraulic control pressure which determines force applied by the actuator(s) and thus determines the reaction torque, the variator being coupled between a rotary transmission input and a rotary transmission output such that the transmission ratio is a function of the variator ratio, the electronic controller being adapted to carry out the following in a loop:

measure a speed ratio of the continuously variable transmission;
compare the measured speed ratio with a target speed ratio;
determine a transmission output torque request on the basis of the said comparison;
convert the output torque request to a control pressure request, taking account of the speed ratio;
differentiate the control pressure request with respect to time to obtain a compensation value and apply the compensation value to the control pressure request; and
output the resulting compensated control pressure request to the hydraulic valve arrangement.

2. An electronic controller as claimed in claim 1, in which the measured speed ratio is the variator ratio.

3. An electronic controller as claimed in claim 2, in which the measured variator ratio is converted to a measured transmission ratio.

4. An electronic controller as claimed in claim 1 in which the comparison of the measured speed ratio with the target speed ratio involves subtracting one from the other.

5. An electronic controller as claimed in claim 1 in which the determination of the output torque request is carried out by a proportional integral controller on the basis of the aforementioned comparison.

6. An electronic controller as claimed in claim 1 in which the compensation value is obtained by multiplying the differential of the control pressure request by a factor corresponding to a time lag in the hydraulic arrangement.

7. A continuously variable transmission comprising:
an electronic controller,
a variator which has a rotary variator input coupled to a first variator race,
a rotary variator output coupled to a second variator race, and
at least one roller which runs upon the said races to transfer drive from one to the other, the roller(s) being movable to steplessly vary the variator ratio,
wherein the variator further comprises:
at least one hydraulic actuator which acts upon the roller(s) and through which net torque acting on the variator races is referred via the roller(s) to the variator's casing, and
a hydraulic arrangement for applying to the actuator(s) at least one hydraulic control pressure which determines force applied by the actuator(s) and thus determines the reaction torque,
the variator being coupled between a rotary transmission input and a rotary transmission output such that the transmission ratio is a function of the variator ratio, and wherein the electronic controller is adapted to carry out the following operations in a loop:
measure a speed ratio of the continuously variable transmission;
compare the measured speed ratio with a target speed ratio;
determine a transmission output torque request on the basis of the said comparison;
convert the output torque request to a control pressure request, taking account of the speed ratio;
differentiate the control pressure request with respect to time to obtain a compensation value and apply the compensation value to the control pressure request; and
output the resulting compensated control pressure request to the hydraulic valve arrangement.

8. A continuously variable transmission as claimed in claim 7 which incorporates a shunt gear and is able to provide geared neutral.

9. A continuously variable transmission as claimed in claim 7 which includes a pressure control valve arranged to output the control pressure to the actuator(s), the pressure control valve being arranged to receive the compensated control pressure request and being adapted to adjust the control pressure in accordance with the request.

10. A continuously variable transmission as claimed in claim 9, in which a conduit connecting the pressure control valve and the actuator incorporates a constricted orifice across which a pressure difference is created by through-flow.

11. A continuously variable transmission as claimed in claim 10 in which the hydraulic arrangement comprises compliance creating a time lag between adjustment of the valve's output pressure and corresponding change in the pressure received in the actuator.

12. A method of controlling a continuously variable transmission comprising a variator which has a rotary variator input coupled to a first variator race, a rotary variator output coupled to a second variator race and at least one roller which runs upon the said races to transfer drive from one to the other, the roller(s) being movable to steplessly vary the variator ratio, the variator further comprising at least one hydraulic actuator which acts upon the roller(s) and through which net torque acting on the variator races is referred via the roller(s) to the variator's casing, and a hydraulic arrangement for applying to the actuator(s) at least one hydraulic control pressure which determines force applied by the actuator(s) and thus determines the reaction torque, the variator being coupled between a rotary transmission input and a rotary transmission output such that the transmission ratio is a function of the variator ratio, the method comprising carrying out the following in a loop:
  measure a speed ratio of the continuously variable transmission;
  compare the measured speed ratio with a target speed ratio;
  determine a transmission output torque request on the basis of the said comparison;
  convert the output torque request to a control pressure request, taking account of the speed ratio;
  differentiate the control pressure request with respect to time to obtain a compensation value and apply the compensation value to the control pressure request; and
  output the resulting compensated control pressure request to the hydraulic valve arrangement.

13. A method as claimed in claim 12 in which determination of the output torque request is carried out by a proportional integral method.

14. A method as claimed in claim 13 in which measurement of the speed ratio involved measuring the input and the output speeds of the variator.

\* \* \* \* \*